United States Patent [19]
Stucker et al.

[11] Patent Number: 5,246,050
[45] Date of Patent: Sep. 21, 1993

[54] TUBELESS SHIELD AND ASSEMBLY

[75] Inventors: John G. Stucker, Stow; Charles K. Schmalix, Canal Fulton; Christopher P. Johenning, Akron; John D. Zeleznik, Hudson, all of Ohio

[73] Assignee: The Goodyear Tire & Rubber Company, Akron, Ohio

[21] Appl. No.: 912,958

[22] Filed: Jul. 10, 1992

[51] Int. Cl.$^5$ ............................................. B60C 17/01
[52] U.S. Cl. .................................. 152/518; 152/158; 152/339.1; 152/341.1; 152/516
[58] Field of Search ............... 152/516, 518, 520, 157, 152/158, 331.1, 339.1, 340.1, 341.1, 342.1, 519

[56] References Cited

U.S. PATENT DOCUMENTS

| | | | |
|---|---|---|---|
| 2,169,041 | 8/1939 | Gammeter | 152/342.1 |
| 2,608,235 | 8/1952 | Wyman | 152/340.1 |
| 2,675,846 | 4/1954 | Wyman | 152/340.1 |
| 2,731,061 | 1/1956 | Clark | 152/341.1 |
| 2,779,380 | 1/1957 | King et al. | 152/341.1 |
| 3,191,654 | 6/1965 | Anderson et al. | 152/341.1 |
| 3,421,535 | 1/1969 | Hawkes et al. | 152/341.1 |
| 3,476,168 | 11/1969 | Huber et al. | |
| 3,487,870 | 1/1970 | Huber | |
| 3,496,983 | 2/1970 | Bartley et al. | |
| 4,153,095 | 5/1979 | Sarkissian | |
| 4,246,948 | 1/1981 | Sarkissian | 152/539 |
| 4,262,724 | 4/1981 | Sarkissian | 152/518 |
| 4,318,434 | 3/1982 | Markow | 152/340.1 |
| 4,995,438 | 2/1991 | Weber et al. | |
| 5,035,273 | 1/1991 | Ruvio | 152/518 |

FOREIGN PATENT DOCUMENTS

| | | | |
|---|---|---|---|
| 0037301 | 3/1977 | Japan | 152/518 |
| 0159598 | 7/1957 | Sweden | 152/518 |

OTHER PUBLICATIONS

Burton, Walker E. *The Story of Tire Beads and Tires*, McGraw Hill Book Company, 1954, pp. 138-141.

Primary Examiner—Michael W. Ball
Assistant Examiner—Robert W. Robey
Attorney, Agent, or Firm—David L. King; David E. Wheeler

[57] ABSTRACT

A tubeless inner tire or shield 14 provides for easy assembly of the shield 14 into the outer tire 12 and over the rim 16 as compared to previous designs. The beads 43 in the shield comprise stranded filaments and the bead portion 40,42 of the shield 14 has increased flexibility. The increased flexibility of the bead portion 40,42 eliminates kinking of the shield 14 upon assembly which could prevent the shield 14 from properly sealing against the rim 16. Air passageways 44 between the inner shield 14 and outer tire 12 are provided on the shield 14 near the bead portion 42. The air passageway 44 includes a protrusion 50 extending from the surface of the shield and has an inclined radially inner surface 58. The inner surface 58 is inclined at an angle of 25° to 60° relative to a plane perpendicular to the axis of rotation of the inner shield 14. The inclined inner surface 58 of the protrusion 50 facilitates the assembly of the inner tire 14 and the outer tire 12 on a rim 16 by functioning as a ramp.

10 Claims, 6 Drawing Sheets

TUBELESS SHIELD AND ASSEMBLY

BACKGROUND OF THE INVENTION

The present invention relates generally to tires and in particular to multi-chambered tires. More particularly this invention relates to an inner tubeless pneumatic shield or inner tire for race tires. This invention provides an improved shield of the type described in U.S. Pat. No. 4,995,438.

Race tires may have an inner tire, otherwise known as a shield, which is mounted on the ledge of the bead seating portion of a rim and which is axially inward of the bead portions of the outer tire. The inner tire has a crown portion, which when mounted, is spaced from the inner surface of the crown or ground engaging portion of the outer tire, and a pair of sidewalls which extend from the axial edges of the crown portion to a bead portion. Each bead portion of the inner tire has a bead core (an annular tensile member) therein. In other words, the inner tire or shield when mounted upon a tire and rim assembly acts as a tire within a tire which helps in stabilizing a vehicle after an outer tire failure. This divides the tire assembly into outer and inner chambers, the outer chamber being the space between the radially outer surface of the inner tire and the radially inner surface of the outer tire while the inner chamber is formed by the inner surface of the inner tire and the rim of the wheel. Typically air is retained within the inner chamber by an air container, such as a tube. The chambers can then be inflated by a dual inflation valve in which air passes through grooves in the radially inner end and axially outer end of the bead portions, such as illustrated in U.S. Pat. No. 3,476,168 to HUBER, et al.

In tires in general, and race tires in particular, it is important to keep the weight of the tire and rim assembly to a minimum in order to optimize fuel efficiency and to decrease the amount of rotating mass to provide for more rapid acceleration/deceleration. A tire and wheel assembly as described above may weigh for example from about 60 lbs. to about 70 lbs. for a 28.0×10.0-15 size tire and a 9.5×15" rim. The air container or inner tube of such an assembly may weigh about 5 lbs. Therefore, if the inner tube could be eliminated, this would result in the tire and wheel assembly being reduced in weight from about 7% to a little more than 8%, which would result in about a 20 lb. reduction in total rotating mass.

The elimination of the air container from the tire and wheel assembly also would eliminate the problem associated with a failure of the air container. If the air container fails, air is then able to pass from the air container to the outer chamber which will result in an equalization of air pressure in both chambers.

The prior art inner shields as disclosed above have conventional automotive type bead wires which are large, stiff, and easily deformed under severe bending. The bent bead wires in most cases prevented the inner shield from properly sealing against the rim flange, thus rendering the shield useless.

Shields with protrusions as disclosed in U.S. Pat. No. 4,995,435 in some cases would not seat properly upon a rim because the shield would get stuck on the outer surface of the bead portion radially inward of the protrusion.

It is important that the inner shield properly and automatically seals against the rim flange because the outer tire prevents access to the inner shield during inflation of the assembly. A shield according to the present invention can be manufactured which is more easily assembled with a consistently high reliability of proper bead seating.

SUMMARY OF THE INVENTION

The present invention relates to a tubeless pneumatic inner tire adapted to be inserted inside a pneumatic outer tire and mounted on a rim such that air pressure in the inner tire and the outer tire can be independently maintained. The inner tire has an interior and an exterior portion, first and second axially opposed beads and a circumferentially extending air passageway located on an exterior portion in the proximity of at least one bead. The air passageway of the inner tire includes a circumferentially extending protrusion in the proximity of and substantially parallel to the bead which contacts the outer tire and maintains a separation between the inner tire and the outer tire except at the protrusion. The protrusion has at least one radially extending groove therein to allow for the passage of air between the inner and outer tires for inflation of the outer tire when the inner tire is mounted on a rim with the outer tire. The improvement of the inner tire comprises an inner surface of the protrusion extending from the inner tire to an axially outer extreme of the protrusion, the inner surface extending axially and radially from the inner tire inclined at 25° to 60° relative to a plane perpendicular to the axis of rotation of the inner tire the inclined surface functioning as a ramp.

The inner tire of the present invention may further have the first and second beads each comprising a bundle of stranded wire, each strand having an outside diameter of less than 0.50 mm.

BRIEF DESCRIPTION OF THE DRAWINGS

The following is a brief description of the drawings in which like parts may bear like reference numerals and in which.

DESCRIPTION OF THE INVENTION

The following definitions are applicable to this specification, including the claims, wherein:

"Axial" and "axially" are used herein to refer to lines or directions that are parallel to the axis of rotation of the tire and rim assembly.

"Bead portion" means are that part of the outer tire or inner tire comprising an annular tensile member wrapped by ply cords and shaped, with or without other reinforcement elements such as flippers, chippers, apexes, toe guards and chafers, to fit the design rim.

"Inner" means toward the inside of the tire and rim assembly and "outer" means toward its exterior.

"Radial" and "radially" are used to mean directions radially toward or away from the axis or rotation of the tire and rim assembly.

Figure 1:
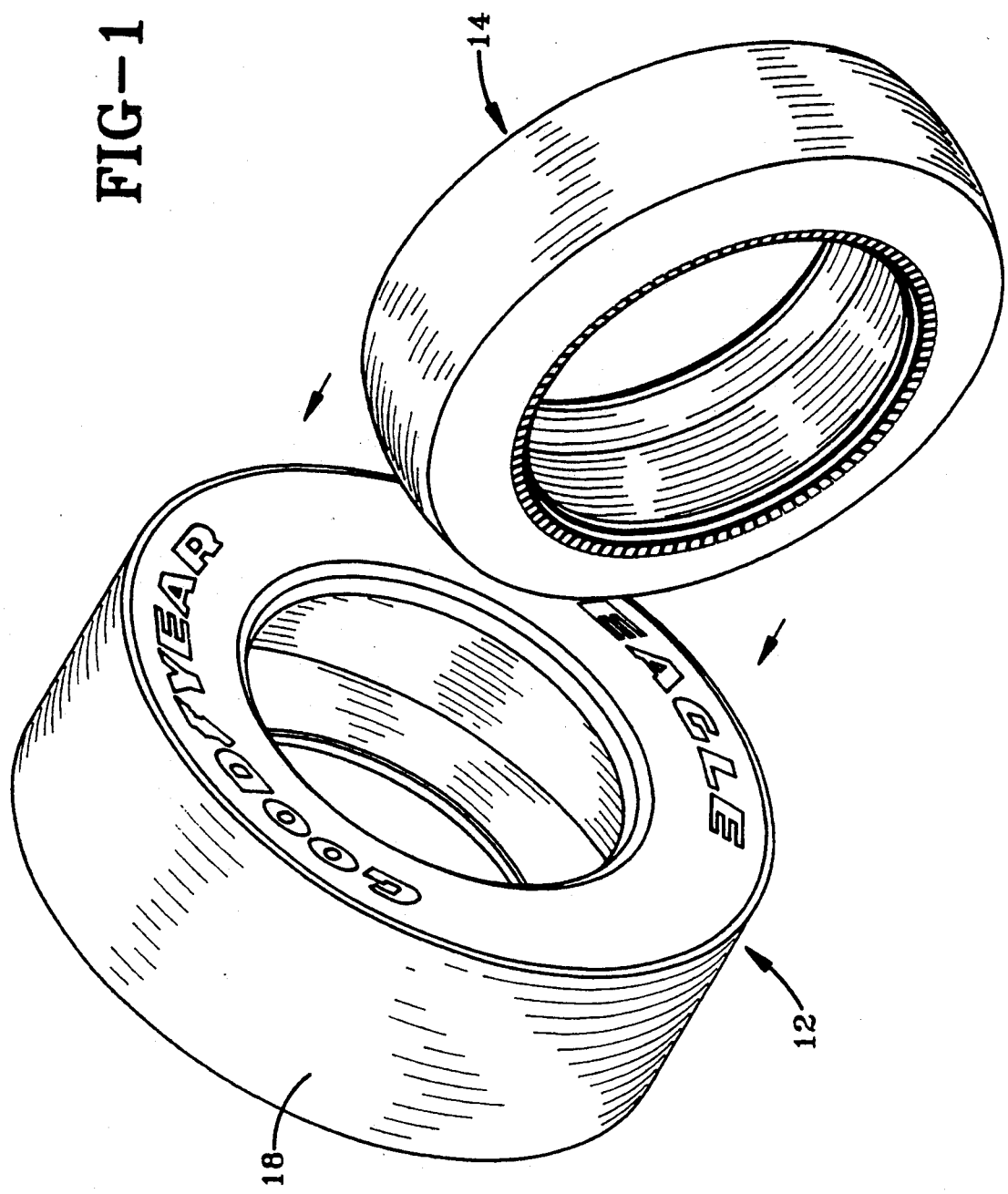
FIG. 1 is a perspective view of an inner and outer tire prior to assembly.
Figure 2:
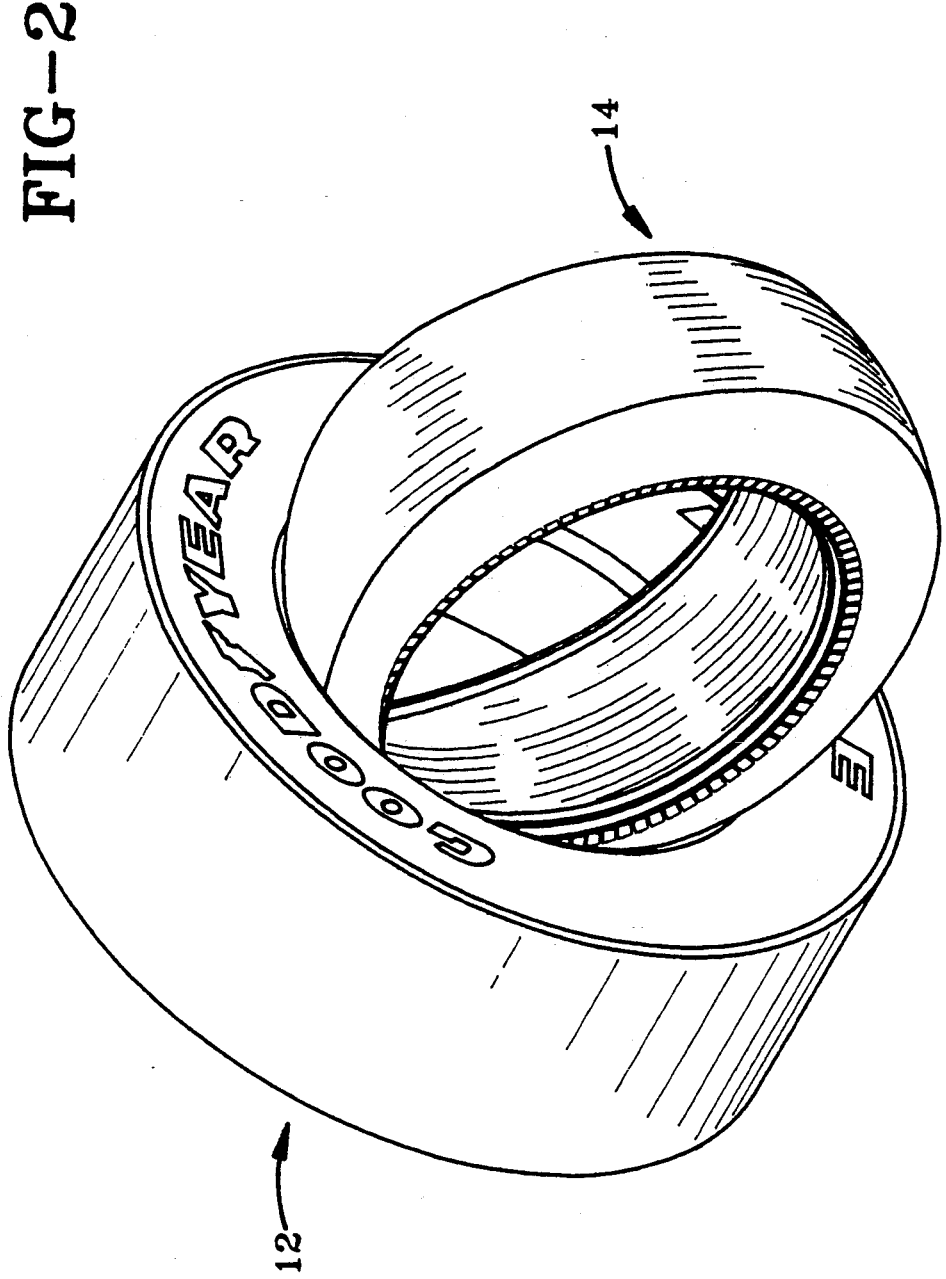
FIG. 2 is a perspective view of an inner tire partially inserted into an outer tire.
Figure 6:
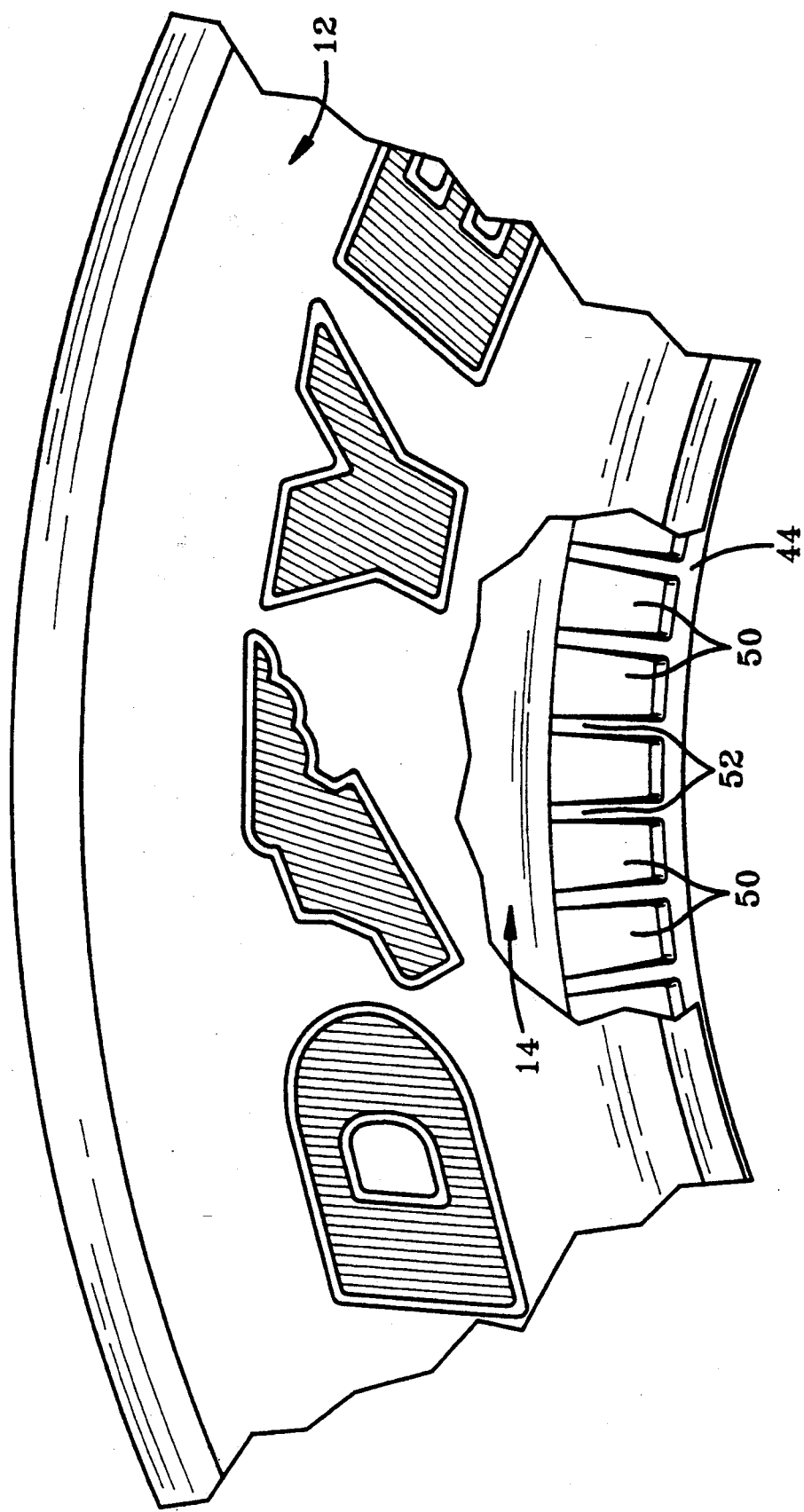
FIG. 6 is a fragmentary side view of the inner and outer tire assembly.

FIGS. 1 and 2 illustrate a tubeless pneumatic outer tire 12 and a tubeless pneumatic inner tire 14. The inner tire 14 is designed to fit within the interior cavity of the outer tire 12. FIG. 2 shows the inner tire 14 being deformed and partially inserted into the outer tire 12. FIG. 6 further illustrates a partial view of the two tires assembled and prior to mounting upon a rim.

It has been found that when bead 43 of shield 14 is made with tire bead wire in the form of a strap bead or cable bead that bead 43 has a tendency to kink when shield 14 is twisted and manipulated for its placement in outer tire 12. A kinked bead makes difficult or impossible the seating of bead portions 40,42 of shield 14 on rim 16. In accordance with the present invention, it has been discovered that when a bead is made using conventional carcass or belt wire that is stranded into a bead, that the flexibility of the beads 43 increases such that kinking does not take place. In the illustrated embodiment, the beads 43 comprise 20 carcass wires that have been wound in the form of a strap bead.

Forms of carcass or belt wires that can be used for bead wire in the invention include 3×0.22/9×0.20+1×0.15 HT, 2+2×0.30 HT, 3×0.265+9×0.245+1×0.151, 2×0.30 HT, and 2+2×0.25. Such stranded wires are conventional and are available from, for example, Tokyo Rope, Eckert and Goodyear. Those skilled in the art will recognize that similar conventional wire constructions will work in the stranded wire bead of the invention.

Figure 3:
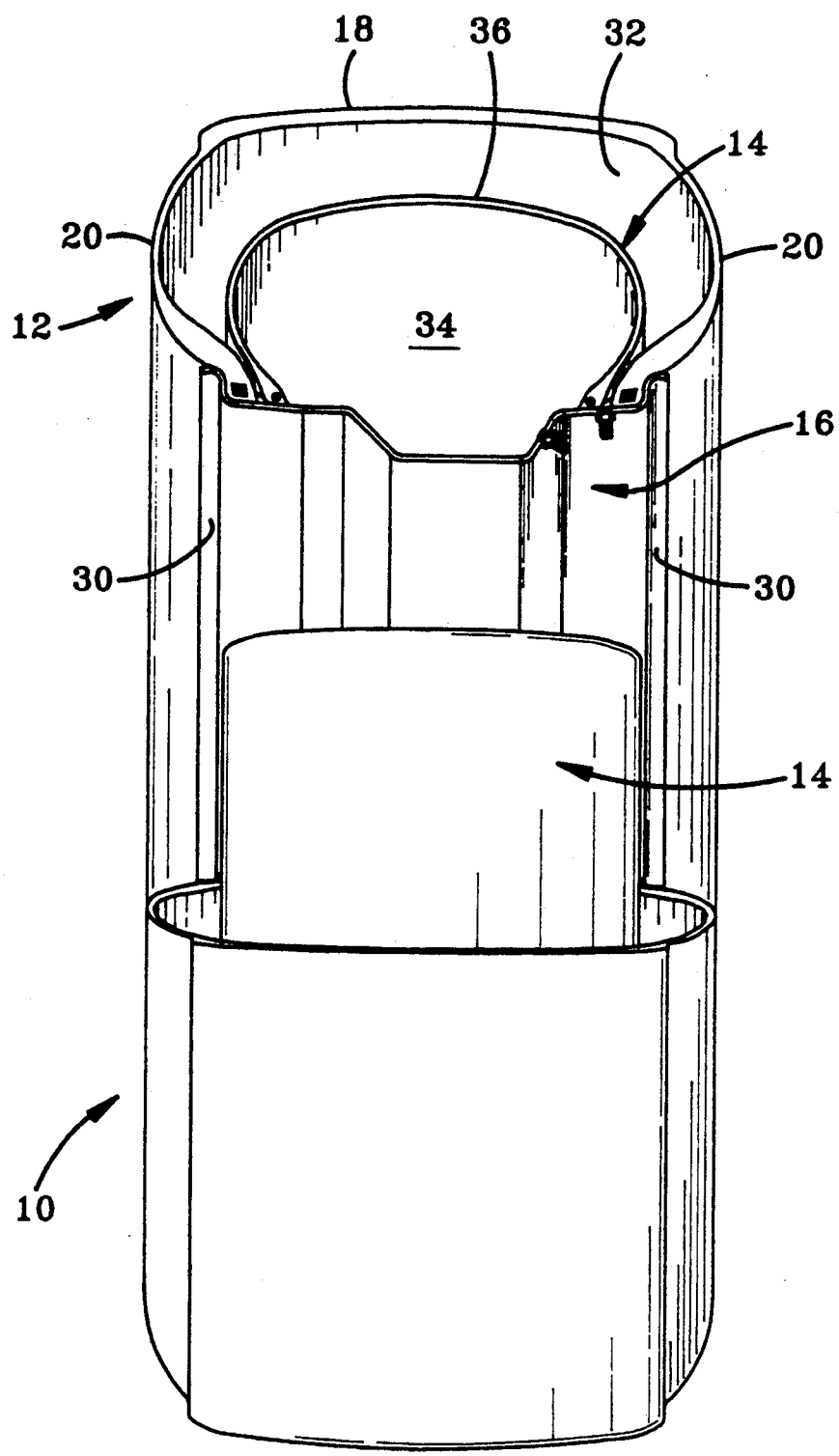
FIG. 3 is a plan view of an assembly including a rim, an outer and an inner tire with portions of the components removed.
Figure 4:
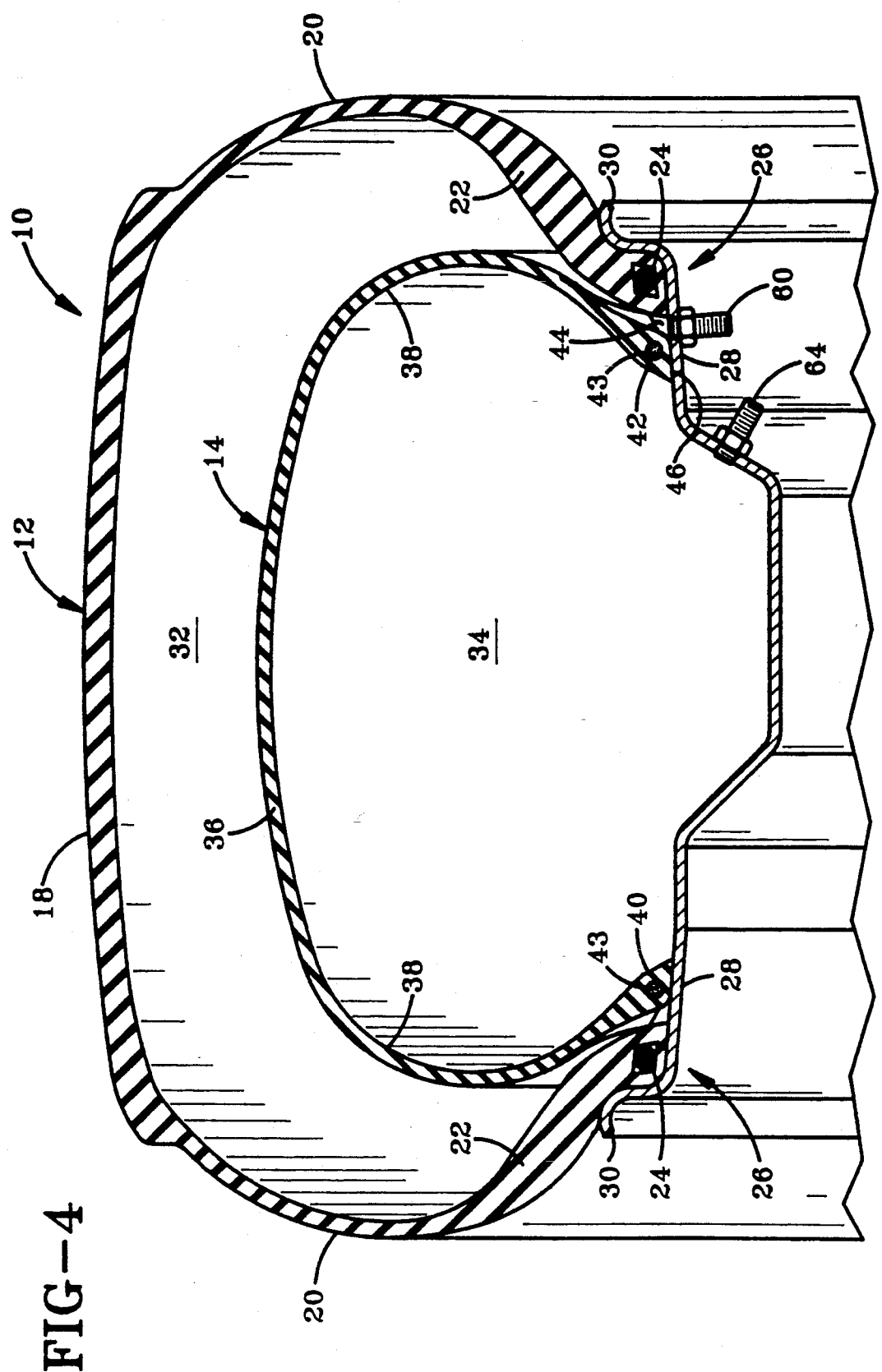
FIG. 4 is a cross-sectional view of the assembly of an outer tire, an inner tire and a rim.
Figure 5:
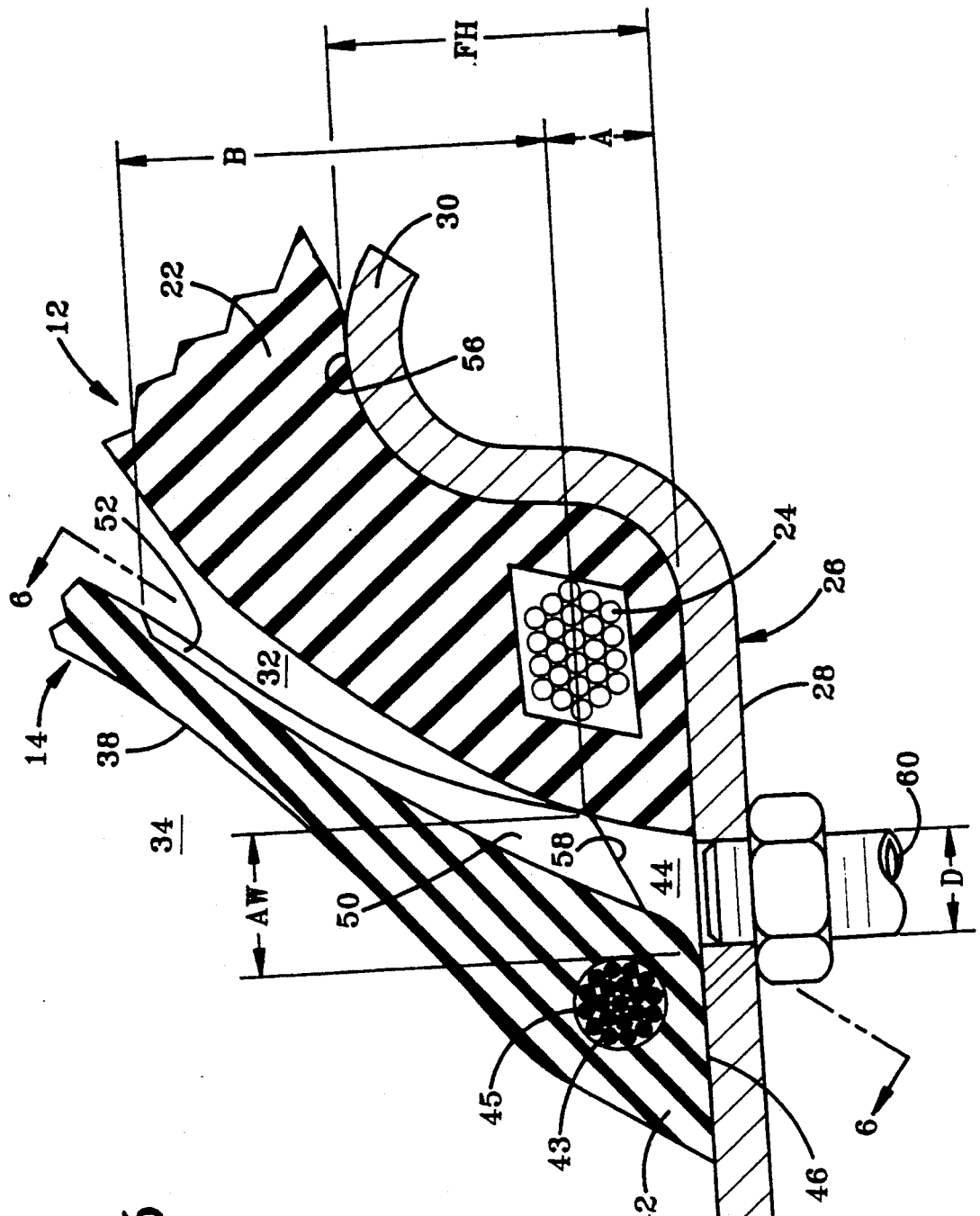
FIG. 5 is an enlarged fragmentary view of the bead area of the outer and inner tires and the ledge and flange of the bead seating portion of the rim.

FIGS. 3 and 4 illustrate views of the inner tire 14 and outer tire 12 assembled onto a rim 16.

In conjunction with the drawings, a tire and rim assembly, shown generally as reference numeral 10 comprises a tubeless pneumatic outer tire 12, a tubeless pneumatic inner tire 14 and a rim 16. The outer tire 12 has a ground engaging tread portion 18 and a pair of axially spaced sidewalls 20 extending radially inwardly from the tread portion 18 to a bead portion 22. Each bead portion 22 has an annular tensile member or bead 24 therein.

The rim 16 has a pair of diametrically opposed annular bead seating portions 26, each having a ledge 28 and radially outwardly extending flange 30. The outer tire 12 is mounted upon the rim 16 such that each bead portion 22 of the outer tire engages both the ledge 28 and the flange 30 of the respective bead seating portion 26.

The tubeless pneumatic inner tire 14 is located within the cavity formed by the outer tire 12 and rim 16 and mounted on the rim to divide the cavity into radially outer 32 and radially inner 34 cavities. The inner tire has a crown portion 36 spaced from the outer tire 12 and a pair of axially spaced sidewalls 38 each extending radially inwardly from the crown portion 36 to a respective bead portion 40,42. The inner tire 14 is mounted upon the rim 16 such that each bead portion 40,42 of the inner tire engages both a ledge 28 and the respective bead portion 22 of the outer tire 12.

The bead portion 42 of the inner tire 14 has a radial inner end 46 adjacent to the respective ledge 28 and an axially outer portion extending radially outwardly from the radial inner end 46 to a protrusion 50 which tapers radially outwardly. Protrusion 50 provides a means for causing at least one bead portion 42 of the inner tire 14 to be both adjacent to and spaced from the respective bead portion 22 of the outer tire 12 to form a circumferentially extending air passageway 44. The protrusion is adjacent to and engages with the respective bead portion 22 of the tire to form the radially outer side of the air passageway 44. In the illustrated embodiment, the protrusion 50 of the bead portion 42 of the inner tire is further provided with at least one groove 52 for allowing the passage of air to and from the outer chamber 32 from the air passageway 44. Radial grooves are illustrated, but those skilled in the art will recognize that the grooves may be at an angle to the radial direction or may be arcuate. In the illustrated embodiment, the protrusion 50 is segmented and has evenly distributed radial grooves 52 throughout the circumference of the protrusion. In the illustrated embodiment there are 192 such grooves 52 (96 per each portion 40,42), but those skilled in the art will recognize that the invention will be operable with any number of grooves from 0 on up, but it is preferred that the number of grooves be in the range of from 1 to 250. It is required only that the protrusion 50 retains enough mass to provide a stable spacing between the outer tire 12 and the inner tire 14. Also, when the protrusion has no grooves, the liner of outer tire 12 may have a channel for permitting the passage of air therethrough. In an alternative embodiment, in the assembly of the inner and outer tire, there may be a ring placed between the inner and outer tire that permits the passage of air, and neither the inner tire or outer tire would have any grooves or channels.

The protrusion 50 is located radially outwardly of the bead seating portion 26 a distance A which is at least 30% of the flange height FH of the flange 28. The flange height FH being the distance from the radially outer surface 54 of the ledge of the bead seating portion 26, to the radially outermost point 56 of the flange. While the distance A is the distance from the radially outer surface 54 of the ledge 28 to the radially inner surface 58 of the protrusion. In other words the distance A is the height of the air passageway. It is believed that the air passageway should have a minimum height A to assure that the air passageway does not collapse or fill with rubber when the inner tire is mounted upon the rim, but is less than the flange height FH to insure a seal between the chambers. For example, the distance may be within the range of about 30% to about 80% of the flange height FH. The protrusion 50 should have a sufficient mass such that an effective seating is provided by the inner tire.

The protrusion 50 and the associated grooves 52 may extend from the radially inner surface of the protrusion 58, radially outwardly a distance B which would assure that the grooves will extend past the point where they could be collapsed by the adjacent bead of the tire. In other words, it should extend past the point of contact between the beads of the inner and outer tire. It is therefore believed to be preferable that B should be equal to or greater than the difference between the flange height FH less the height of air passageway A, (FH-A). It is still more preferred that the distance B is at least 2X(FH-A).

It has been found that the seating of the inner tire to the rim is facilitated if the radially inner surface 58 is inclined in the range of 25° to 60° relative to a plane perpendicular to the axis of rotation of the inner tire. The inclined surface 58 extends from the point of contact between the inner and outer tire to the bead portion 42 of the inner tire creating a ramp like surface that assists the inner tire's radially inner end 46 to proper seating upon the rim flange ledge 28. During assembly, the inner tire is at least partially located in the well of rim 16, air pressure is supplied through the valve 64, and the inner tire inflates and the inner tire expands radially and axially outwardly. The portion of the bead area within the well area of the rim 16 contacts the radially inner surface 58 of the protrusion 44. The inclined surface functions as a ramp. The air pressure forces the inner tire against the rim flange. The inclined surface 58 pushes the bead portion 42 radially outwardly as the inner tire 14 expands. The bead portion 42 is sufficiently positioned such that the forces generated by the air pressure consistently moves the beads into the seated position. The inclined surface 58 extends from the inner tire 14 such that the surface 58 is at least partially radially aligned with or inward of the radial position of the bead bundle 43. This insures that the resistance to seating is minimized. In the prior art inner tire, as disclosed in U.S. Pat. No. 4,995,438, the radially inner surface of the protrusion was parallel to the axis of rotation of the inner tire creating a horizontal surface that could not assist in seating the bead portion against the flange. Occasionally the prior art inner tire would catch in the well of the rim and the air pressure would simply escape into the outer tire chamber without seating the inner tire. In the assembly, access to the inner tire is not feasible; therefore, the inner tire must reliably seat on a consistent basis.

The inclined surface 58 insures that the inner tire properly seats. The range of angles of inclination between 25° and 60° permit a consistent seating of the bead portion 42. The range of 25° to 45° is the preferred range. An inclination of 45° is considered the best mode of practicing the invention.

A valve 60 is provided in the bead seating portion 26 for allowing the passage of air to and from the air passageway 44. In order to assure that the air can pass to and from the air passageway, the axial width AW of the air passageway should be larger than the opening 62 in the rim through which the valve is inserted. Preferably, the axial width AW of the air passageway is at least 1.2 times the diameter D of the valve opening 62.

The assembly is further provided with another valve 64 which is attached to the rim 16 for providing air to and from the inner chamber 16. A standard rim 16 currently used with race tires can be used by adding the valve 60 to the ledge of the bead seating portion.

After the outer tire and the inner tire have been mounted upon the rim of the wheel, the inner chamber 34 is inflated through valve 64 in order to seat the inner and outer tires to the rim. After this has been accomplished, the outer chamber is inflated through valve 60. Air passes through the valve 60 into the air passageway 44, and through the radially extending grooves 52 to the outer chamber. The outer chamber is then inflated to a pressure which is less than the inner chamber pressure.

The other bead portion 40 of the inner tire may be also furnished with the protrusion and grooves similar to that of the bead portion 42. This is not required. It does, however, provide for a balanced inner tire and consequently a better balanced assembly.

While certain representative embodiments and details have been shown for the purpose of illustrating the invention, it will be apparent to those skilled in this art that various changes and modifications may be made therein without department from the scope of the invention.

What is claimed:

1. A tubeless pneumatic tire insert, the insert being an inner tire adapted to be inserted inside a pneumatic outer tire and mounted on a rim, the inner tire having an interior portion and an exterior portion and first and second axially opposed beads, and a circumferentially extending air passageway located on an exterior portion in the proximity of at least one bead, wherein the air passageway of the inner tire includes a circumferentially extending protrusion in the proximity of and substantially parallel to said bead which contacts said outer tire and maintains a separation between said inner tire and said outer tire except at said protrusion, the improvement comprising:
   said protrusion has an inner surface (58) extending from the inner tire to an axially outer extreme of the protrusion, the inner surface extending axially and radially from said inner tire inclined at 25° to 60° relative to a plane perpendicular to the axis of rotation of the inner tire.

2. The tubeless inner tire of claim 1 further comprising at least one groove in said protrusion for allowing the passage of air between the inner and outer tire for inflation of the outer tire after assembly.

3. A tubeless pneumatic inner tire of claim 1, wherein the inner surface is inclined in the range of 25° to 45° relative to a plane perpendicular to the axis of rotation of the inner tire.

4. The pneumatic inner tire of claim 1 wherein the first and second beads comprise a bundle of stranded wire, each strand having an outside diameter of less than 0.5 mm.

5. A tubeless pneumatic inner tire of claim 1, wherein the inner surface is inclined in the range of 30° to 60° relative to a plane perpendicular to the axis of rotation of the inner tire.

6. An improved tubeless pneumatic tire insert, the insert being an inner tire adapted to be inserted inside a pneumatic outer tire and mounted on a rim, the inner tire having first and second axially opposed beads, the improvement comprising:
   said first and second axially opposed beads comprise a bundle of stranded wire each strand having an outside diameter of less than 0.5 mm and a protrusion located on the exterior portion in the proximity of at least one bead, the protrusion having an inner surface extending from the inner tire to an axially outer extreme of the protrusion, the inner surface extending axially and radially from said inner tire inclined at 25° to 60° relative to a plane perpendicular to the axis of rotation of the inner tire.

7. A tire and rim assembly comprising:
   a rim having a pair of diametrically opposed annular bead seating portions, each bead seating portion having a ledge and a radially outwardly extending flange;
   a tubeless pneumatic outer tire mounted on said rim having an inner cavity and a pair of axially opposed bead portions, each bead portion being disposed adjacent to a ledge and a respective flange of one of said bead seating portions of said rim;
   a tubeless pneumatic inner tire disposed within said tire cavity, mounted on said rim, dividing said inner cavity into inner and outer chambers and, having first and second axially opposed bead portions, the first and second axially opposed bead portions, the first bead portion of the inner tire being disposed adjacent to a ledge of one of said bead seating portions of the rim and the respective bead portion of the outer tire, and the second bead portion of the inner tire being disposed adjacent to the ledge of the other bead seating portion of the rim and is both disposed adjacent to and spaced from the respective bead portion of the outer tire to form a circumferentially extending air passageway, and said second bead portion of said inner tire having a radially inner end adjacent to the ledge of the respective bead seating portion and an axially outer portion located radially outwardly from the inner end adjacent said ledge and extends axially outwardly from said radially inner end to a protrusion tapering radially outwardly, said protrusion being adjacent to said bead portion of the outer tire and located radially outwardly of the ledge of the respective bead portion; and an inflation valve carried by said rim for allowing the passage of air to and from the air passageway; and an inflation means carried by said rim for allowing the passage of air to and from the inner chamber, the improvement comprising:

said protrusion has an inner surface (58) extending from the inner tire to an axially outer extreme of the protrusion, the inner surface extending axially and radially from said inner tire inclined at 25° to 60° relative to a plane perpendicular to the axis of rotation of the inner tire.

8. The assembly of claim 7 wherein said protrusion of the inner tire has a plurality of radially extending grooves therein to allow the passage of air to and from the air passageway.

9. The assembly of claim 7 wherein the protrusion and the associated grooves have a radial length of at least equal to or greater than the difference between the flange height less the height of the air passageway.

10. The assembly of claim 7 wherein said tubeless tire inner beads comprise a bundle of stranded wire, each strand having an outside diameter of less than 0.5 mm.

* * * * *